(12) United States Patent
Han et al.

(10) Patent No.: US 7,757,891 B2
(45) Date of Patent: Jul. 20, 2010

(54) METHOD AND APPARATUS FOR PROVIDING CONSTANT LIQUID RATES AND DISPENSING PRECISELY REPEATABLE LIQUID VOLUMES

(75) Inventors: Leon Han, San Jose, CA (US); Russell D. Moulton, San Jose, CA (US)

(73) Assignee: ChemFlow Systems, Inc., San Jose, CA (US)

( * ) Notice: Subject to any disclaimer, the term of this patent is extended or adjusted under 35 U.S.C. 154(b) by 795 days.

(21) Appl. No.: 11/685,765

(22) Filed: Mar. 14, 2007

(65) Prior Publication Data

US 2008/0223483 A1    Sep. 18, 2008

(51) Int. Cl.
*B67D 1/00*    (2006.01)

(52) U.S. Cl. .............................. 222/64; 222/69; 222/71; 222/108; 222/424.5; 222/442; 222/481.5; 141/198; 73/149

(58) Field of Classification Search ............. 222/64–69, 222/71, 108, 110, 424.5–425, 426, 428, 442–444, 222/450, 481.5; 141/198; 137/139, 391, 137/144; 73/861, 149
See application file for complete search history.

(56) References Cited

U.S. PATENT DOCUMENTS

| | | | | |
|---|---|---|---|---|
| 2,814,303 A * | 11/1957 | Fifer | ............................... | 137/8 |
| 3,583,437 A * | 6/1971 | Mastroianni et al. | ......... | 137/558 |
| 3,695,485 A * | 10/1972 | Littlejohn | ..................... | 222/68 |
| 3,760,981 A * | 9/1973 | Weed | ............................ | 222/14 |
| 4,106,671 A * | 8/1978 | Sharples | ....................... | 222/61 |
| 4,161,957 A * | 7/1979 | Schoellkopf | ................ | 137/205 |
| 4,490,044 A * | 12/1984 | Saito et al. | .................... | 366/17 |
| 4,630,753 A * | 12/1986 | Anscherlik | .................... | 222/17 |
| 5,012,955 A * | 5/1991 | Shannon | ...................... | 222/61 |
| 5,154,205 A * | 10/1992 | Langill | ........................ | 137/393 |
| 5,568,882 A * | 10/1996 | Takacs | ......................... | 222/61 |
| 5,680,960 A * | 10/1997 | Keyes et al. | ................... | 222/64 |
| 5,771,917 A * | 6/1998 | Carney et al. | ................ | 137/238 |
| 5,937,455 A * | 8/1999 | Donati | .......................... | 4/665 |
| 5,971,009 A * | 10/1999 | Schuetz et al. | .............. | 137/312 |
| 6,021,921 A * | 2/2000 | Lan et al. | ....................... | 222/61 |
| 6,024,251 A * | 2/2000 | Mayer et al. | ................... | 222/64 |
| 6,516,754 B2 * | 2/2003 | Chadwick | ................... | 122/19.1 |
| 6,669,052 B2 * | 12/2003 | Barbe | ........................... | 222/55 |
| 6,712,239 B2 * | 3/2004 | Schell et al. | ................... | 222/64 |
| 6,886,705 B2 * | 5/2005 | Souma et al. | ............... | 220/86.2 |
| 2005/0284882 A1 * | 12/2005 | Belongia | ...................... | 222/64 |

* cited by examiner

*Primary Examiner*—Frederick C. Nicolas
(74) *Attorney, Agent, or Firm*—Wuxi Sino IP Agency, Ltd.; Joe Zheng

(57) ABSTRACT

Techniques for dispensing a type of liquid in a specific amount or at a constant flow rate are disclosed. According to one aspect of the present invention, a height difference between an inlet and an outlet is maintained by an adjustable tubing assembly. An overflow assembly is provided to divert any overflow of the liquid from entering a reservoir and keep a specific level of the liquid. A valve is provided to the inlet and can be turned off when a sensor detects that there is an overflow of the liquid in the overflow assembly.

16 Claims, 2 Drawing Sheets

METHOD AND APPARATUS FOR PROVIDING CONSTANT LIQUID RATES AND DISPENSING PRECISELY REPEATABLE LIQUID VOLUMES

BACKGROUND OF THE INVENTION

1. Field of the Invention

The invention is generally related to the area of liquid flow and dispensing. More particularly, the present invention is related to the measurement and control of dispensing specific liquid volumes and liquid flow rates.

2. The Background of Related Art

There are many applications in which various liquids need to be mixed with precise ratios. Dispensing specific amounts of liquids per a rate controls the formulation of a liquid mixture. The process is traditionally achieved through the use of either balance scales or metering pumps. Metering pumps have the additional capability of providing not only a specific amount of liquid, but also a specific flow rate of liquid. However, both of these devices need to be recalibrated periodically in order to keep accuracy. If a balance scale or metering pump was found to be out of calibration, all measurements since the last calibration could be questionable, potentially leading to recalls and remanufacture of suspected products from the balance scale or metering pump.

Therefore, there is a great need for techniques of measuring and controlling both the dispensing of liquid amounts and liquid flow rates thereof, without the need for periodic recalibration.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention pertains to techniques of dispensing a type of liquid in a specific amount or at a constant flow rate. According to one aspect of the present invention, a height difference between an inlet and an outlet is maintained by an adjustable tubing assembly. An overflow assembly is provided to divert any overflow of the liquid from entering a reservoir and keep a specific level of the liquid. A valve is provided to the inlet and can be turned off when a sensor detects that there is an overflow of the liquid in the overflow assembly.

According to another aspect of the present invention, the tubing assembly that can be adjusted upwards and downwards includes a valve that can be used to allow the gravity to slowly bleed the liquid from the tubing assembly. Depending on implementation, the level of the liquid may be maintained by at least one level sensor or an overflow assembly. By maintaining the level of the liquid in the tank at a desired level, a constant height of the liquid is maintained. This constant height of the liquid maintains a constant head pressure on the liquid exiting through the outlet, resulting in a constant flow rate.

According to one embodiment, the present invention is a dispensing system that comprises a reservoir, uprightly positioned and connected to a tubing assembly, with an opening coupled to an inlet via a valve and an overflow assembly, an outlet connected to the reservoir via a tubing assembly, wherein a type of fluid enters the reservoir via the inlet and the valve and exits in a specific amount from the outlet, the specific amount precisely determined by a height difference between the inlet and the outlet. The specific amount of the liquid can be repeated dispensed from the dispensing system.

The dispensing system can also provide a constant flow rate of the liquid by maintaining a constant height of the liquid in a reservoir at a level, wherein the constant height of the liquid maintains a constant head pressure on the liquid exiting through an outlet, resulting in a constant flow rate.

Other objects, features, and advantages of the present invention will become apparent upon examining the following detailed description of an embodiment thereof, taken in conjunction with the attached drawings.

BRIEF DESCRIPTION OF THE DRAWING

These and other features, aspects, and advantages of the present invention will become better understood with regard to the following description, appended claims, and accompanying drawings where:

DETAILED DESCRIPTION OF THE PREFERRED EMBODIMENTS

The detailed description of the present invention is presented largely in terms of procedures, steps, logic blocks, processing, or other symbolic representations that directly or indirectly resemble the operations of fluid mixing, delivery and control. These process descriptions and representations are typically used by those skilled in the art to most effectively convey the substance of their work to others skilled in the art. Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Figure 1:
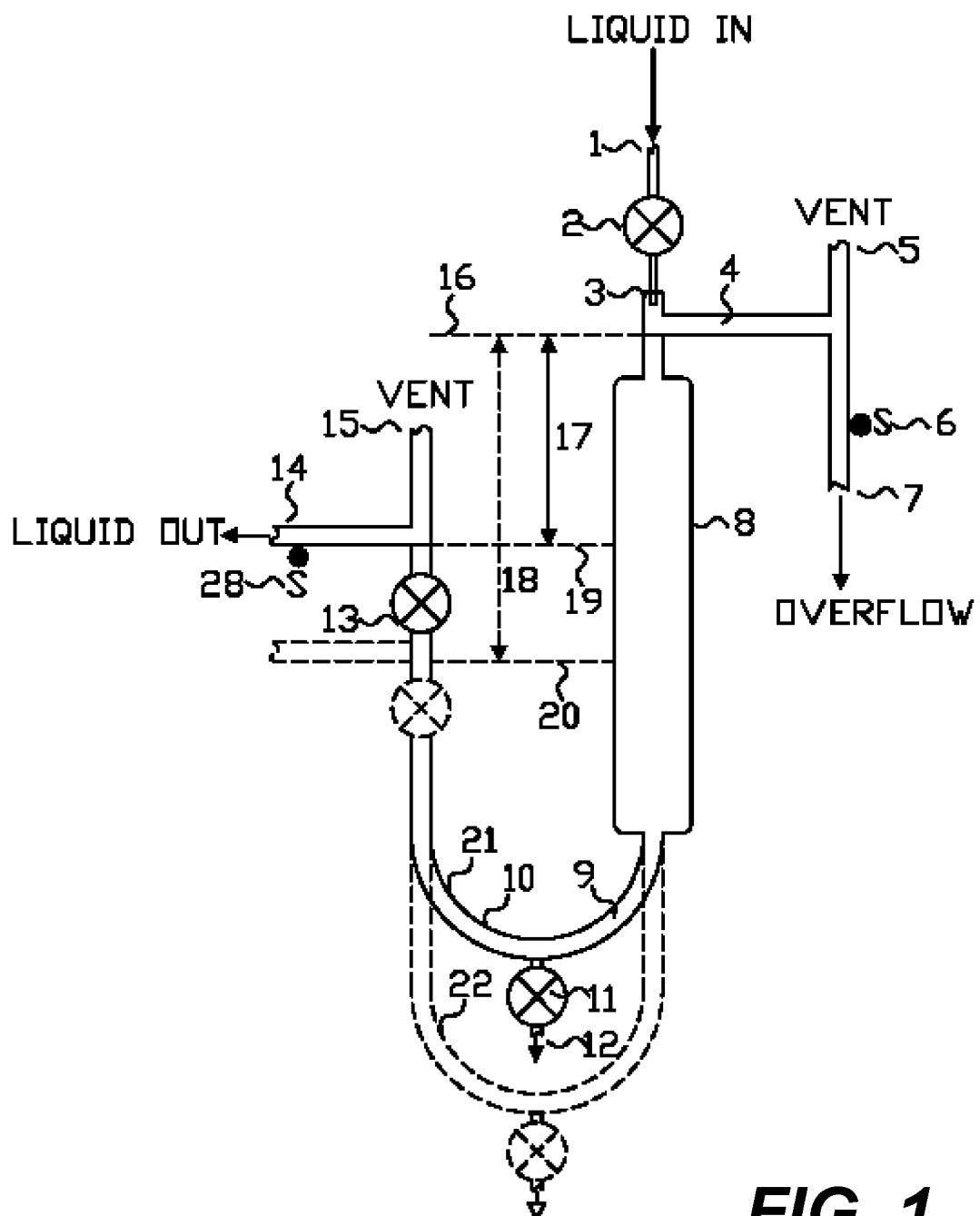
FIG. 1 is a schematic representation using a U-tube according to one embodiment of the present invention.
Figure 2:
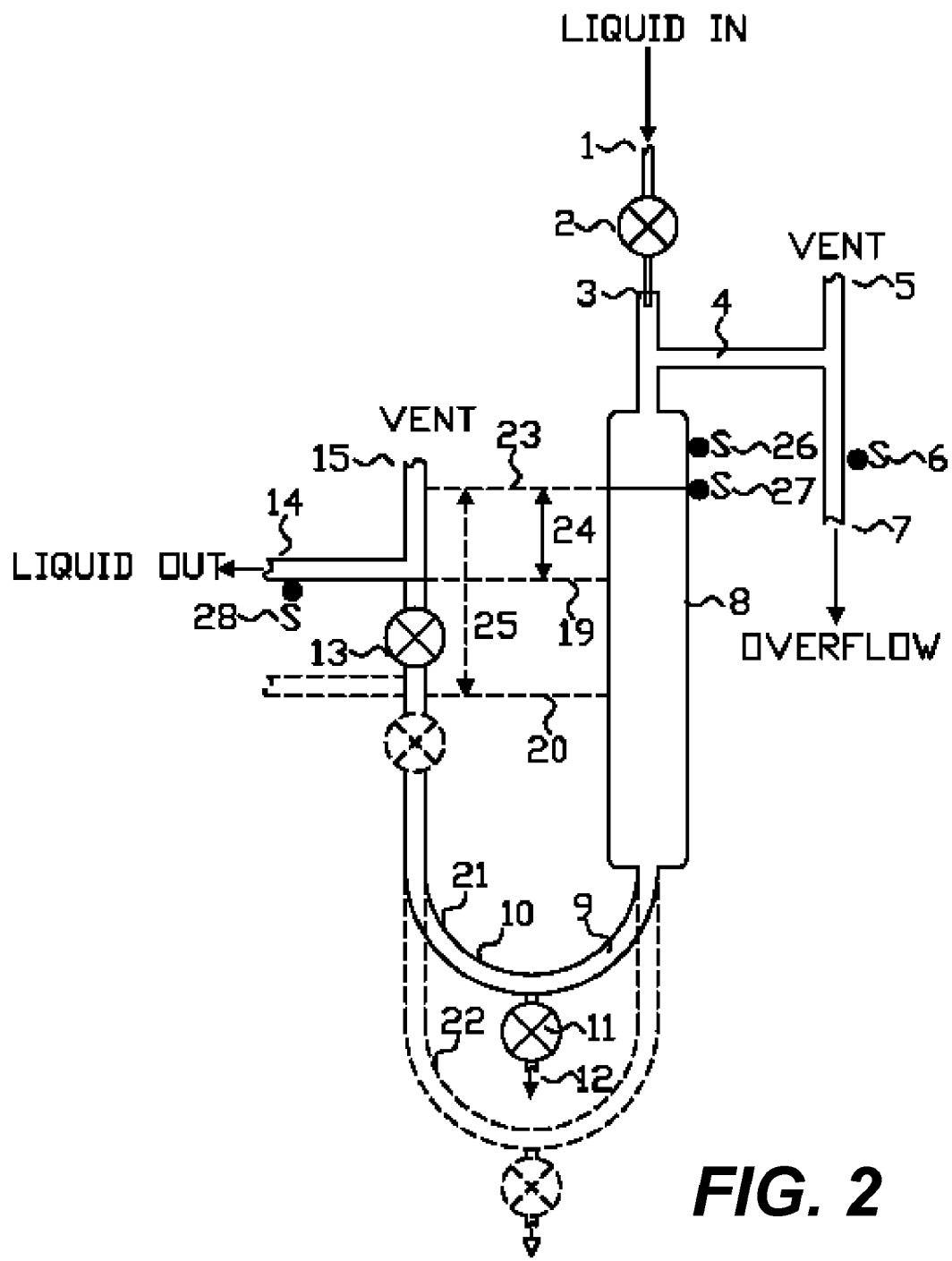
FIG. 2 is a schematic representation of using a U-tube according to another embodiment of the present invention.

Embodiments of the present invention are discussed herein with reference to FIGS. 1-2. However, those skilled in the art will readily appreciate that the detailed description given herein with respect to these figures is for explanatory purposes only as the invention extends beyond these limited embodiments.

Referring now to the drawings, in which like numerals refer to like parts throughout the several views. FIG. 1 shows a system of using a U-tube assembly to achieve the accuracy of dispensing a fixed amount of liquid according to one embodiment of the present invention. A type of liquid (e.g., chemical liquid) enters at an inlet 1 via a valve 2, provided that the valve 2 is turned on. If a reservoir 8 is not full, the liquid enters and accumulates in the reservoir 8. Depending on implementation, the reservoir 8 may be a tank, a section of tube or any container that can hold a certain volume. When the liquid level 16 is reached, the liquid, if continuing to come from the inlet 1, will go through the tube section 4 to the opening 7, where it flows by gravity as an overflow into a container (not shown).

The use of the opening 3 is considered desirable to prevent air bubbles from being accumulated or introduced into the system, but is not specifically required. A sensor 6, such as a capacitive sensor, is provided to detect if there is an overflow coming from the tube 4. If the sensor 6 detects that there is an overflow, the valve 2 can be turned off to discontinue the flow of the fluid. When the sensor 6 detects that there is no overflow, provided the overflow has just stopped, the valve 13 can be turned on to dispense the fluid. By the height difference 17, an exact amount of the fluid can be dispensed every time after the reservoir 8 is filled up to the level line 16 (e.g., substantially at the level of the overflow assembly). Likewise, when the sensor 28 detects that there is no flow of the fluid coming from the outlet 14, the valve can be turned off for a next cycle (e.g., refilling the reservoir 8 from the inlet 1 via the valve 2).

Connected to the reservoir 8, there is an assembly 9 including a tubing 10, a valve 11, an outlet valve 13, an outlet 14, a vent 15 and a sensor 28. By gravity, the liquid continues to flow through the tubing 10 and allowed to flow out of the outlet 14 through valve 13, if the fluid is to be dispensed. In an initial preparation (i.e., getting ready for a first cycle), any air previously trapped in the tubing 10 can now escape from the outlet 14 and vent 15 when the fluid flows in to fill up to the level 19 through the tubing 10. The valve 13 is closed. The liquid now completely fills the assembly 9, and the liquid level continues to rise until the reservoir 8 is filled up up to the level 16. The liquid, if the valve 2 is still on, will now flow through the side tube 4 into an overflow tube 7. Any excess liquid overflowing through outlet 7 can be collected in a reservoir and reintroduced through the inlet 1, for example, by a pump.

According to one embodiment, the sensor 6 is triggered by a flow of the liquid through the tube 7, thus causing the valve 2 to close. When the sensor 6 indicates that the excessive amount of the liquid has drained out from the tube 7, the valve 13 is caused to open, thus dispensing the liquid through the outlet 14. The level of the liquid in the reservoir 8 starts to drop from a level 16. The flow of the liquid through the outlet 14 stops when the liquid level in the reservoir 8 reaches a level 19.

The vent 15 ensures that a siphoning effect does not occur, which might otherwise cause the liquid to continue and draw the level in the reservoir 8 below the level 19. When the liquid flow through the outlet 14 has ceased, the sensor 28 detects that the dispensing is complete, and signals the valve 13 to close. The filling and dispensing process can now be repeated.

By maintaining the outlet 14 at the level 19, the gravity induced flow through the assembly 9 is precisely controlled by the height differential 17. Thus each cycle of operation will deliver the exact same amount of the liquid through the outlet 14. If the movable assembly 9 is moved from an exemplary position 21 to an exemplary position 22, the outlet 14 is now moved to the level 20, which corresponds to a larger height differential 18, thus leading to a larger dispensed volume of the liquid.

According to another embodiment, the system in FIG. 1 can also be used to provide a constant flow rate. As the liquid enters at the inlet 1 and passes through the valve 2 into the opening 3 where it flows into the reservoir 8 and the tubing 10. Through the valve 13, the liquid exits through the outlet 14. The inflow rate through the valve 2 exceeds the outflow rate through the outlet 14, and thus the liquid level in the reservoir 8 rises until it reaches the tube 4, and thus overflows through the outlet 7. When the sensor 6 detects that there is an overflow, the valve 2 is signaled to close so as to keep the same amount of liquid in the system (including the reservoir 8 and the assembly 9). By maintaining the liquid level in the reservoir 8 at the level 16, a constant height of the liquid 17 is maintained. This constant height of liquid maintains a constant head pressure on the liquid exiting through the outlet 14, resulting in a constant flow rate. Any excessive liquid overflowing through the outlet 7 can be collected in a reservoir and reintroduced through inlet 1, for instance by a pump.

Referring now to FIG. 2, it shows that an embodiment uses additional liquid sensors to control the level of the liquid for dispensing specific volumes of a type of liquid. The liquid flows in through an inlet 1 and passes through a valve 2 into an opening 3. Initially, the liquid flows into a tank or reservoir 8 and a movable assembly 9, displacing air from a tubing section 10 and eventually flows out through a valve 13 into an outlet 14. As the air has escaped from the system (including all tubing, the assembly 9 and the reservoir 8), a sensor 28 detects a flow of the liquid and signals the valve 13 to close. The liquid now fills up the assembly 9, and the liquid level continues to rise until it reaches a sensor 27. The sensor 27 detects when the reservoir 8 is filled with the liquid up to its level, and signals the valve 2 to close.

If the flow rate of the liquid through the valve 2 is high, the resulting liquid level in the reservoir 8 may overshoot beyond the desired level 23. Another sensor 26 is provided to detect that the liquid level has reached a higher level, and the valve 11 is caused to open, which allows the gravity to slowly bleed the liquid from the assembly 10. When the liquid surface drops to a level equal to or just slightly below the level 23, the sensor 27 detects this, and causes the valve 11 to close. According to one embodiment, the sensor 26 is provided to give a warning signal when the fluid is detected in a repeated dispensing cycle.

When the liquid level in the reservoir 8 is stable, the valve 13 is signaled to open, allowing the liquid to dispense through the outlet 14. The liquid ceases to dispense when the level in the reservoir 8 reaches a level 19. The absence of the liquid in the outlet 14 is detected by the sensor 28, which signals the valve 13 to close and the valve 2 to open, preparing the system for a next dispense cycle.

It can be appreciated that the amount of the liquid dispensed is limited by the height differential 24. If the assembly 9 is moved from an exemplary position 21 to an exemplary position 22, the outlet 14 is now at the lower level of the height 20, and the amount of the liquid to be dispensed will increase to a larger volume, limited by the larger height differential 25. It should be noted that in some instances it may be desirable to use the valve 11 as an inlet, rather than, or in addition to use as an outlet.

According to another embodiment, the system of FIG. 2 is also used to control the flow rate by utilizing some liquid sensors to control the level of the liquid at a constant height so as to achieve a constant flow rate. A type of liquid flows in through the inlet 1, passes through the valve 2, and the opening 3, where it flows into the reservoir 8 and the movable assembly 9, displaces air from the tubing 10, and eventually flows out through the outlet 14 via the valve 13. The liquid inflow rate through the valve 2 exceeds the outflow rate through the valve 13, causing the liquid level in the reservoir 8 to rise until it reaches a level that can be detected by the sensor 27.

When this occurs, the valve 2 is signaled to close, allowing the liquid level to drop to just below the sensor 27. When the sensor 27 can no longer detect the presence of the liquid, the valve 2 is signaled to open again. This process maintains the liquid level at the height 23, leading to a constant height differential 24 above the height 19 and keeping a constant head pressure on the liquid exiting through the outlet 14. As a result, a constant flow rate of liquid can be achieved.

It is readily apparent that this invention utilizes differential height of a type of liquid to control the amount or rate of the liquid being dispensed. By simply fastening the inlet and outlet in fixed positions, the amount or rate of the liquid being dispensed cannot drift from the originally determined point, but is readily adjustable by unfastening and repositioning to achieve new differential heights between the inlet and outlet. Movement of the set points of the inlet and outlet may be controlled by simple mechanical fasteners, or by means of remotely controlled actuators. A type of liquid can be introduced into the system by a variety of means including pumps, pressure vessels, or elevated reservoirs.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the forgoing description of embodiments.

We claim:

1. A dispensing system comprising:
   a reservoir, uprightly positioned and connected to a tubing assembly, with an opening coupled to an inlet via a valve and an overflow assembly;
   an outlet connected to the reservoir via a tubing assembly, wherein the overflow assembly is physically positioned apart from the outlet by a height difference, the outlet is movable upwards or downwards by repositioning the tubing assembly, a type of fluid flows into the reservoir via the inlet and the valve and exits in a specific amount from the outlet, the specific amount precisely determined by the height difference between the inlet and the outlet.

2. The dispensing system as recited in claim 1, wherein when a liquid reaches beyond a level of the overflow assembly, the liquid goes to the overflow assembly.

3. The dispensing system as recited in claim 2, wherein the overflow assembly includes a vent and an overflow opening.

4. The dispensing system as recited in claim 3, further comprising a reservoir that is provided to collect an overflow of the liquid from the overflow opening.

5. The dispensing system as recited in claim 2, wherein the overflow assembly includes a sensor that causes the valve to turn off when the sensor detects that there is an overflow of the liquid in the overflow assembly, the sensor causes the valve to turn on after the specific amount of fluid is dispensed.

6. The dispensing system as recited in claim 1, wherein the inlet is physically positioned higher than the outlet.

7. The dispensing system as recited in claim 1, wherein the tubing assembly includes a release valve that, when opened, allows a liquid to slowly bleed gravity from the tubing assembly.

8. The dispensing system as recited in claim 7, further comprising a first sensor and a second sensor on the reservoir, the first sensor provided to detect a level of the liquid in the reservoir, the second sensor provided to detect any overshoot of the liquid beyond a level of the first sensor.

9. The dispensing system as recited in claim 8, wherein, when the liquid drops to a level equal to or just slightly below a level of the first sensor, the first sensor causes the release valve to close.

10. The dispensing system as recited in claim 8, wherein, if a flow rate of the liquid through the valve is high, the liquid in the reservoir overshoots beyond a level of the first sensor, which is detected by the second sensor that in return causes the valve to close.

11. The dispensing system as recited in claim 1, wherein the opening of the reservoir is to prevent air bubbles from being accumulated or introduced into the dispensing system.

12. The dispensing system as recited in claim 1, further comprising an outlet valve connected between the outlet and the tubing assembly.

13. The dispensing system as recited in claim 12, wherein the outlet valve is only opened to release air trapped in the dispensing system when the liquid is entering the reservoir.

14. The dispensing system as recited in claim 12, wherein the outlet valve is closed while the liquid is filling the reservoir up to a level of the overflow assembly.

15. The dispensing system as recited in claim 14, wherein the specific amount of the liquid is dispensed from the dispensing system.

16. The dispensing system as recited in claim 1, wherein a constant height of a liquid is maintained by keeping the liquid level in the reservoir at a level, the constant height of the liquid maintains a constant head pressure on the liquid exiting through the outlet, resulting in a constant flow rate.

* * * * *